United States Patent
Tatsu et al.

[11] Patent Number: 6,160,051
[45] Date of Patent: Dec. 12, 2000

[54] PROCESS FOR PRODUCING FLUORINE-CONTAINING BLOCK COPOLYMER

[75] Inventors: Haruyoshi Tatsu; Yasuyoshi Hisamatsu, both of Kitaibaraki, Japan

[73] Assignee: Nippon Mektron, Limited, Japan

[21] Appl. No.: 09/315,771

[22] Filed: May 20, 1999

[30]     Foreign Application Priority Data

Jun. 11, 1998 [JP] Japan .................................. 10-163091

[51] Int. Cl.⁷ ..................................... C08F 283/06
[52] U.S. Cl. .............................. 525/90; 525/91; 525/404; 526/247; 526/248; 526/249; 524/366
[58] Field of Search ................................ 525/404, 90, 91; 526/247, 248, 249; 524/366

[56]         References Cited

U.S. PATENT DOCUMENTS

| 3,882,193 | 5/1975 | Rice et al. | 525/404 |
| 4,973,762 | 11/1990 | Tohzuka et al. | 568/615 |

FOREIGN PATENT DOCUMENTS

| 54-1585 | 1/1979 | Japan . |
| 58-4728 | 1/1983 | Japan . |
| 61-233088 | 10/1986 | Japan . |
| 1-131233 | 5/1989 | Japan . |
| 1-265049 | 10/1989 | Japan . |

*Primary Examiner*—Rachel Gorr
*Attorney, Agent, or Firm*—Baker & Daniels

[57]         ABSTRACT

A fluorine-containing copolymer having a solvent resistance and a cold resistance is produced by subjecting vinylidene fluoride and at least one of other fluorine-containing monomers to copolymerization reaction in the presence of a polyfluoropolyether having iodo groups at both terminals, represented by the following formula:

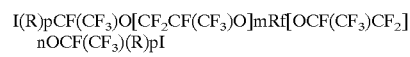

$$I(R)_pCF(CF_3)O[CF_2CF(CF_3)O]_mRf[OCF(CF_3)CF_2]_nOCF(CF_3)(R)_pI$$

wherein Rf: perfluoroalkylene group of $C_2$–$C_6$; R: alkylene group or polyfluoroalkylene group of $C_2$–$C_8$; these alkylene groups may contain an ether bond or may be an alkyleneamide-containing or phenylene diamide-containing group; m+n: 20 or more; and p: 0 or 1. The copolymerization reaction is carried out preferably in the presence of a bromine-containing or iodine-containing monomer compound.

8 Claims, No Drawings

PROCESS FOR PRODUCING FLUORINE-CONTAINING BLOCK COPOLYMER

BACKGROUND OF THE INVENTION

1. Field of the Invention

The present invention relates to a process for producing a fluorinecontaining block copolymer, and more particularly to a process for producing a fluorine-containing block copolymer having good solvent and cold resistances.

2. Related Art

JP-B-54-1585 discloses a fluorine-containing polymer composition comprising a fluorine-containing polymer copolymerized with not more than 3% by mole of bromine-containing olefins, and an organic peroxide. Peroxide-crosslinked products from the composition show a fairly good cold resistance, but the solvent resistance is not satisfactory yet, as shown in the results of after-mentioned Comparative Example 1 (1).

JP-B-58-4728 also discloses a fluorine-containing, poly-segmented polymer obtained by copolymerization reaction, using an iodine compound as a chain-transfer agent. No improvement in the cold resistance is expectable, because the iodine compound as a chain-transfer agent is a low molecular weight compound.

Thus, they cannot be used as vulcanization molding materials such as seal materials for a fuel oil system requiring good solvent and cold resistances.

SUMMARY OF THE INVENTION

An object of the present invention is to provide a process for producing a fluorine-containing copolymer having good solvent and cold resistances.

The object of the present invention can be attained by producing a fluorine-containing copolymer by subjecting vinylidene fluoride and at least one of other fluorine-containing monomers to copolymerization reaction in the presence of a polyfluoropolyether having iodo groups at both terminals, represented by the following general formula:

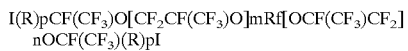

where Rf is a perfluoroalkylene group having 2 to 6 carbon atoms; R is an alkylene group or a polyfluoroalkylene group having 2 to 8 carbon atoms and these alkylene groups may contain an ether group or may be an alkyleneamide group-containing or phenylenediamide group-containing group,; m and n each are positive integers and sum total of m and n is 20 or more: and p is 0 or 1. The copolymerization reaction is carried out preferably in the presence of a bromine-containing monomer or an iodine-containing monomer.

DETAILED DESCRIPTION OF THE INVENTION

Vinylidene fluoride, which is the main component of fluorine-containing copolymer, is subjected to copolymerization reaction so as to make up about 30 to about 85% by mole, preferably about 40 to about 80% by mole of the resulting copolymer. Below about 30% by mole, the resulting copolymer will have a poor cold resistance, whereas above about 85% by mole no satisfactory rubbery properties will be obtained.

Other fluorine-containing monomers to be copolymerized with vinylidene fluoride have preferably 2 to 8 carbon atoms and include, for example, tetrafluoroethylene, hexafluoropropene, pentafluoropropene, chlorotrifluoroethylene, methyl perfluorovinyl ether, ethyl perfluorovinyl ether, n- or iso-propyl perfluorovinyl ether, n-, iso- or tert-butyl perfluorovinyl ether, n- or iso-amyl perfluorovinyl ether, perfluoro(methyl vinyl ether), perfluoro(ethyl vinyl ether), perfluoro(n- or iso-propyl vinyl ether), perfluoro(n-, iso- or tert- butyl vinyl ether), perfluoro(n- or iso-amyl vinyl ether), perfluoro (propoxypropyl vinyl ether), etc., at least one of which can be used. Besides, vinyl fluoride, trifluoroethylene, perfluorocyclobutene, perfluoro(methylcyclopropene), hexafluoroisobutene, 1,2,2-trifluorostyrene, perfluorostyrene, etc. can be used.

These fluorine-containing monomers can be also copolymerized with an olefinic compound having 2 to 6 carbon atoms. The olefinic compound having 2 to 6 carbon atoms includes, for example, ethylene, propylene, butene, unsaturated vinyl esters such as vinyl acetate, etc., and alkyl vinyl ethers such as methyl vinyl ether, ethyl vinyl ether, etc., and can be subjected to copolymerization usually in a ratio of about 10% by weight or less on the basis of the fluorine-containing monomer.

Copolymerization reaction between these monomers is carried out preferably in the presence of a bromine-containing or iodine-containing monomer compound to introduce crosslinkable groups into the fluorinecontaining copolymer.

The bromine-containing monomer compound for use to introduce crosslinkable groups includes, for example, brominated vinyl compounds or brominated olefins such as vinyl bromide, 2-bromo-1,1-difluoroethylene, perfluoroallyl bromide, 4-bromo-1,1,2-trifluorobutene-1, 4-bromo-3,3,4,4-tetrafluorobutene-1, 4-bromo-1,1,3,3,4,4-hexafluorobutene-1, bromotrifluoro-ethylene, 4-bromo-3-chloro-1,1,3,4,4-pentafluorobutene-1, 6-bromo-5,5,6,6-tetrailuorohexene-1, 4-bromoperfluorobutene-1, 3,3-difluoroallyl bromide, etc. Preferably, a brominated group-containing vinyl ether represented by the following general formula can be used:

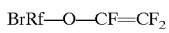

where BrRf represents a brominated perfluoroalkyl group of $C_1$ to $C_5$.

The brominated group-containing vinyl ether includes, for example, $CF_2BrCF_2OCF=CF_2$, $CF_2Br(CF_2)_2OCF=CF_2$, $CF_2Br(CF_2)_3OCF=CF_2$, $CF_3CFBr(CF_2)_2OCF=CF_2$, $CF_2Br(CF_2)_4OCF=CF_2$, etc. Details of these compounds are disclosed in U.S. Pat. No. 4,745,165.

Besides, brominated vinyl ethers represented by the following general formula $ROCF=CFBr$ or $ROCBr=CF_2$, where (R is a lower alkyl group or a fluoroalkyl group), etc. disclosed in U.S. Pat. No. 4,564,662, can be also used.

The iodine-containing monomer compound includes, for example, iodotifluoroethylene, 1,1-difluoro-2-iodoethylene, perfluoro(2-iodoethyl vinyl ether), vinyl iodide, etc.

The bromine- or iodine-containing monomer compounds can be used in a proportion of about 0.05 to about 5% by mole, preferably about 0.1 to about 1% by mole, to the sum total of vinylidene fluoride, other fluorine-containing monomer, etc. Below about 0.05% by mole, the resulting vulcanization product will have a poor compression set characteristic, whereas above about 5% by weight the resulting vulcanization product will have a lower elongation.

More specifically, fluorine-containing copolymers (vinylidene fluoride copolymers) based on the following monomer combinations can be used in the present invention:

VdF-HFP
VdF-HFP-BDFE
VdF-HFP-FBrVE
VdF-HFP-BTFE
VdF-HFP-IDFE
VDF-HFP-IEVE
VDF-HFP-ITFE
VdF-TFE-HFP
VdF-FMVE
VDF-CTFE
VdF-HFP-E
VdF-TFE-FMVE
VdF-CTFE-E
VdF-FMVE-E
VdF-TFE-FMVE-E
VDF-TFE-CTFE
VdF-TFE-HFP-E
VdF-TFE-CTFE-E
VdF-TFE-HFP-FMVE
VdF-CTFE-TFE-FMVE
VdF-TFE-HFP-FMVE-E
VdF-CTFE-TFE-FMVE-E
VdF-TFE-YMVE-BDFE
VdF-TFE-FMVE-FBrVE
VdF-TFE-FMVE-IDFE
VdF-TFE-MPVE
VdF-TFE-MPVE-E
VdF-TFE-MPVE-FBrVE
VdF-TFE-MiPVE
VdF-TFE-PiPVE
VdF-TFE-TDVE
VdF-TFE-PDVE
VdF-TFE-PD3E
VdF-TFE-TDVE-FBrVE
VdF-TFE-PDVE-FBrVE
VdF-TFE-MiPVE-FBrVE (Abbreviation) VdF: vinylidene fluoride
HFP: hexafluoropropene
BDFE: 1-bromo-2,2-difluoroethylene
FBrVE: perfluoro(bromoethyl vinyl ether)
BTFE: bromotrifluoroethylene
IDFE: 1-iodo-2,2-difluoroethylene
IEVE: perfluoro(iodoethyl vinyl ether)
ITFE: iodotrifluoroethylene
TFE: tetrafluoroethylene
FMVE: perfluoro(methyl vinyl ether)
CTFE: trichlorofluoroethylene
E: ethylene
MPVE: perfluoro(methoxypropyl vinyl ether)
MPVE: perfluoro(methoxyisopropyl vinyl ether)
DVE: perfluoro(hexaoxytridecanyl vinyl ether)
    $CF_2=CFOC_2F_4(OCF_2)_5OCF_3$
PDVE: perfluoro(heptaoxypentadecanyl vinyl ether)
    $CF_2=CFOC_2F_4(OCF_2)_6OCF_3$
P3VE: perfluoro(3,6-dioxy-1,2-trifluoromethylnonanyl vinyl ether)
    $CF_2=CFO[CF_2CF(CF_3)O]_2C_3F_7$ These vinylidene fluoride copolymers can be block-copolymerized through both terminal iodo groups of polyfluoropolyether represented by the foregoing general formula.

The polyfluoropolyether having iodo groups at both terminals for use in the present invention can be obtained by reaction of terminal groups —OCF(CF$_3$)COF of a compound represented by the following general formula:

$$FOCCF(CF_3)O[CF_2CF(CF_3)O]mRf[OCF(CF_3)CF_2]nOCF(CF_3)COF$$

with the following compounds:

—OCF(CF$_3$)COF+CF$_2$=CF$_2$+I$_2$+CsF  (1)

→—OCF(CF$_3$)CF$_2$OCF$_2$CF$_2$I

—OCF(CF$_3$)CF$_2$OCF$_2$CF$_2$I+CH$_2$=CH$_2$

→—OCF(CF$_2$)CF$_2$OCF$_2$CF$_2$CH$_2$CH$_2$I

—OCF(CF$_3$)CF$_2$OCF$_2$CF$_2$I+CH$_2$=CHCH$_3$

→—OCF(CF$_3$)CF$_2$OCF$_2$CF$_2$CH$_2$CH(CH$_3$)I

—OCF(CF$_3$)COF+I$_2$+Cs$_2$CO$_3$  (2)

→—OCF(CF$_3$)I

—OCF(CF$_3$)I+CH$_2$=CH$_2$

→OCF(CF$_3$)CH$_2$CH$_2$I

—OCF(CF$_3$)I+CH$_2$=CHCH$_3$

→OCF(CF$_3$)CH$_2$CH(CH$_3$)I

—OCF(CF$_3$)COF+H$_2$NCH$_2$CH=CH$_2$+ICl  (3)

→—OCF(CF$_3$)CONHCH$_2$CHCICH$_2$I (4)

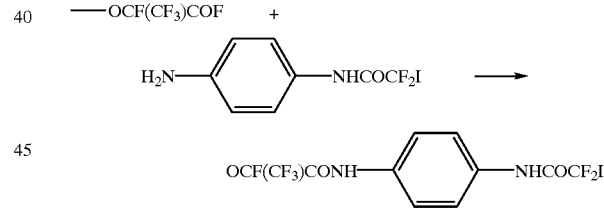

Sum total m+n of polyfluoropolyether having iodo groups at both terminals is 20 or more, preferably 30 or more. Below 20, the resulting fluorine-containing block copolymer will have no more satisfactory solvent resistance or cold resistance.

The polyfluoropolyether having iodo groups at both terminals can be used in a proportion of about 3 to about 25% by weight, preferably about 10 to about 25% by weight, to the sum total of vinylidene fluoride, other fluorinecontaining monomer, etc. The polyfluoropolyether can [PFE] blockpolymerize with fluorine rubber [FKM] through the iodo groups at both terminals to give a block copolymer as given by the following formula:

I-FKM-PFE-FKM-I

Above about 25% by weight of PFE, the resulting block copolymer will have too low a viscosity, so that the processability would be troublesome, whereas below about 3% by weight no desired effective improvement of solvent resistance and cold resistance will be obtained.

Copolymerization reaction can be carried out even by radical solution polymerization using a fluorine-based solvent, but usually can be carried out by emulsion polymerization using a water-soluble peroxide catalyst, preferably a redox catalyst thereof, in an aqueous medium. Preferable water-soluble peroxide catalyst includes persulfates such as ammonium persulfate, potassium persulfate, sodium persulfate, etc.

The emulsifier for the emulsion polymerization includes fluorinated emulsifiers such as fluorinated aliphatic carboxylic acid salts, phosphate or sulfate esters of fluorinated alcohol, etc., or ordinary emulsifiers such as sulfate esters of higher aliphatic alcohols, aromatic sulfonates, etc. These water-soluble emulsifiers can be used singly or in combination thereof in a proportion of about 0.001 to about 10% by weight, preferably about 0.01 to 1% by weight, to the aqueous medium.

Copolymerization reaction using these catalyst and emulsifier can be carried out at a reaction temperature of about 0° to about 80° C., preferably about 20° to about 60° C. Above about 80° C., the molecular weight of the resulting copolymer will be lowered and the decomposition rate of the polymerization catalyst will be too larger, resulting in lower efficiency, whereas below about 0° C. the polymerization rate will be impractically lowered. A higher polymerization pressure is desirable so far as copolymers of uniform composition can be obtained. Usually, a polymerization pressure of not more than about 100 Kg/cm² gage is used.

Molecular weight of the fluorine-containing elastomer can be adjusted, if required, using a chain-transfer agent such as methanol, ethanol, isopentane, diethyl malonate, carbon tetrachloride, etc.

The emulsion polymerization can produce as a dispersion of block copolymers well emulsified in an aqueous medium, and fluorine-containing block copolymers having a Mooney viscocity $ML_{1+10}$ (125° C.) of about 5 to about 80, preferably about 10 to about 50, can be readily obtained from the dispersion by a well known separating means such as coagulation, etc.

The fluorine-containing block copolymers can be cured by various well known conventional vulcanization procedures, for example, by peroxide vulcanization using an organic peroxide; polyamine vulcanization using a polyamine compound; polyol vulcanization using a polyhydoroxy compound; or irradiation with radiation beams, electron beams, etc. Above all, the peroxide vulcanization is particularly preferable because the cured elastomer can have distinguished mechanical strength and can provide a vulcanization product having distinguished chemical resistance, wear resistance, solvent resistance, etc. as a result of formation of structurally stable carbon-carbon bonds at crosslinking sites.

Organic peroxides for use in the peroxide vulcanization include, for example, 2,5-dimethyl-2,5-bis(tert-butylperoxy) hexane, 2,5-dimethyl-2,5-bis(tert-butylperoxy)hexine-3, benzoyl peroxide, bis(2,4-dichlorobenzoyl) peroxide, dicumyl peroxide, di-tert-butyl peroxide, tert-butyl cumyl peroxide, tert-bytylperoxybenzene, 1,1-bis(tert-butylperoxy)-3,5,5-trimethylcyclohexane, 2,5-dimethylhexane-2,5-dihydroxyperoxide, α, α'-bis(tert-butylperoxy)-p-diisopro-pylbenzene, 2,5-dimethyl-2,5-di(benzoylperoxy)hexane, tert-butyl-peroxyisopropyl carbonate, etc.

In the peroxide vulcanization using the organic peroxide, a polyfunctional unsaturated compound such as tri(meth) allyl isocyanurate, tri(meth)allyl cyanurate, triallyl trimellitate, N,N'-m-phenylene bismaleimide, diallyl phthalate, tris(diallylamine)-s-triazine, triallyl phosphite, 1,2-polybutadiene, ethylene glycol diacrylate, diethylene glycol diacrylate, etc. can be usually used as a crosslinking agent to obtain more distinguished vulcanization characteristics, mechanical strength, compression set characteristics, etc.

A divalent metal oxide or hydroxide such as oxides or hydroxides of calcium, magnesium, lead, zinc, etc. can be also used as a crosslinking aid, if desired. These compounds can also act as an acid acceptor.

The foregoing respective components for the peroxide vulcanization system are usually used in the following proportions to 100 parts by weight of the fluorine-containing block copolymer: about 0.1 to about 10 parts by weight, preferably about 0.5 to about 5 parts by weight, of an organic peroxide; about 0.1 to about 10 parts by weight, preferably about 0.5 to about 5 parts by weight, of a crosslinking agent; and not more than about 15 parts by weight of a crosslinking aid.

The foregoing respective components for the vulcanization system can be mixed and kneaded directly with the fluorine-containing block copolymer or diluted with carbon black, silica, clay, talc, diatomaceous earth, barium sulfate, etc., or used as a master batch dispersion for the fluorine-containing block copolymer. Besides the foregoing respective components, the compound can contain so far well known fillers, reinforcing agents, plasticizers, lubricants, processing aids, pigments, as desired. Carbon black as a filler or a reinforcing agent can be used in a proportion of about 10 to about 50 parts by weight to 100 parts by weight of the fluorine-containing block copolymer.

To improve the flowability in the vulcanization molding, the present fluorine-containing block copolymer can be mixed with a perfluoropolyether oil in a proportion of about 5 to about 30 parts by weight, preferably about 5 to about 15 parts by weight, to 100 parts by weight of the fluorine-containing block copolymer.

The perfluoropolyether oil includes, for example, the following compounds:

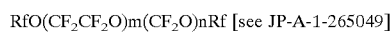
RfO(CF₂CF₂O)m(CF₂O)nRf [see JP-A-1-265049]

where Rf: perfluoro lower alkyl group having 1 to 5 carbon atoms m+n=3 to 200

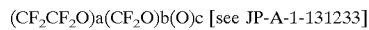
(CF₂CF₂O)a(CF₂O)b(O)c [see JP-A-1-131233]

where a+b=2 to 230 c/(a+b)=0 to 0.1

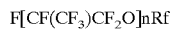
F[CF(CF₃)CF₂O]nRf where Rf: perfluoro lower alkyl group having 1 to 5 carbon atoms n=5 or more on average, preferably 15 to 50

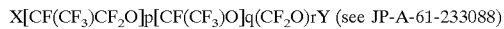
X[CF(CF₃)CF₂O]p[CF(CF₃)O]q(CF₂O)rY (see JP-A-61-233088)

where, X: CF₃(CF₂)nO (n: 0, 1 or 2)

Y: (CF₂)mCF₃ (m: 0 or 1)

p+q+r=1 to 100 (q and r may be zero)

Vulcanization can be carried out by mixing the foregoing respective components by an ordinary mixing means such as roll mixing, kneader mixing, Banbury mixing, solution mixing, etc. and heating the resulting mixture. Heating is carried out usually at about 100° to about 250° C. for about 1 to about 120 minutes for press vulcanization and at about 150 to about 300° C. for 0 to 30 hours for oven vulcanization (secondary vulcanization).

The present fluorine-containing block copolymer has a higher fluorine content due to blockwise introduction of perfluoropolyether into the main chain and thus has improved solvent resistance and cold resistance.

The fluorine-containing block copolymer having such improved solvent resistance and cold resistance can be suitably used as vulcanization molding materials, etc. such as seal materials for a fuel oil system.

Fluorine rubber comprising vinylidene fluoride as the main constituent has not been able to undergo mixing with perfluoropolyether oil as a plasticizer usually due to the compatibility, but the present fluorine-containing block copolymer can undergo satisfactory mixing therewith.

PREFERRED EMBODIMENTS OF THE INVENTION

The present invention will be described in detail below, referring to Examples.

REFERENCE EXAMPLE 1

A mixture consisting of 300 g of diglyme, 150 g of $Cs_2CO_3$ and 160 g of iodine was heated at 35°~50° C. for 4 hours, and then mixed with 3,352 g of the following dicarboxylic acid difluoride, followed by reaction at 50°~70° C. for 4 hours:

FOCCF($CF_3$)O[$CF_2$CF($CF_3$)O]m($CF_2$)$_2$[OCF($CF_3$)$CF_2$] nOCF($CF_3$)COF (a product commercially available from P & M, Moscow, Russia, where m+n=51). Foaming once took place due to gas generation, and the time when the foaming was ended was regarded as an end point of the reaction.

The resulting blackish brown reaction mixture was then mixed with 3,500 g of $C_3HF_5Cl_2$ (mixture of $CF_3CF_2CHCl_2$ and $CF_2ClCF_2$ CHClF) and 1 liter of an aqueous 5% $Na_2SO_4$ solution, followed by stirring, washing and separation into layers. The lower layer was taken out and subjected to repetition of the foregoing operations, whereby the lower layer was substantially decolored to a light brown liquid. The light brown liquid was washed twice with 1 liter of water, and the separated lower layer was dehydrated with anhydrous $MGSO_4$, filtered, subjected to solvent removal by distillation and drying under reduced pressure.

Iodine element analysis of the light brown liquid reaction product revealed 2.67% I (2.78% I as calculated) and it was found by infrared absorption spectrum that there was no absorption of —COF at 1,880 cm$^{-1}$.

Thus, the compound (PFE-1) was confirmed to have the following formula.

ICF($CF_3$)O[$CF_2$CF($CF_3$)O]m($CF_2$)$_2$[OCF($CF_3$)$CF_2$]nOCF($CF_3$)I where m+n≈51 and MW=9,050 for PFE-1.

REFERENCE EXAMPLE 2

A mixture consisting of 300 g of diglyme, 32.7 g of p-NHCOCF$_2$Isubstituted aniline (a product commercially available from P & M, Moscow, Russia), 300 g of $C_3HF_5Cl_2$, 889.2 g of dicarboxylic acid difluoride used in Reference Example 1 and 30.3 g of triethylamine was subjected to reaction at 40°~60° C. for 8 hours. The reaction mixture was washed with 500 ml of water and separation of the lower layer was repeated three times, followed by dehydration with anhydrous $MgSO_4$, solvent removal by distillation and drying under reduced pressure, whereby 910.2 g of a liquid reaction product [PFE-2] was obtained.

Iodine element analysis of the reaction product revealed 2.68% I (2.77% I as calculated), and it was found by infrared absorption spectrum that there were absorptions at 1,700 cm$^{-1}$, (for —CONH—) and 1,600 cm$^{-1}$ and 1,540 cm$^{-1}$ (both for benzene ring). Thus, the compound (PFE-2) was confirmed to have the following formula:

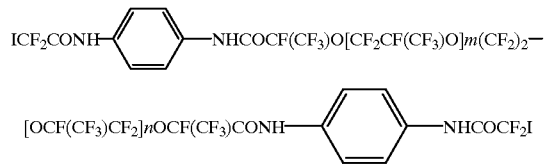

where m+n≈51 and MW=9474 for PFE-2.

EXAMPLE 1

Into an autoclave having a capacity of 10L were charged the following compounds:

| | |
|---|---:|
| Tetrafluoroethylene [TFE] | 183 g |
| Vinylidene fluoride [VdF] | 821 g |
| Perfluoro(methyl vinyl ether) [FMVE] | 608 g |
| Perfluoro(2-bromoethyl vinyl ether) [FBrVE] | 12.1 g |
| PFE-1 of Reference Example 1 | 416.4 g |
| $Na_2HPO_4$ | 11.0 g |
| $NaHSO_3$ | 0.8 g |
| $C_3F_7O(CF_2)_3OCF(CF_3)COONH_4$ | 15.4 g |
| Hexafluoroisopropanol | 66 g |
| Water | 3660 ml |

After heating the autoclave to 45° C., 1.6 g of potassium persulfate was added thereto to initiate polymerization reaction. After the reaction for 24 hours, the autoclave was cooled and the unreacted gas was discharged therefrom to discontinue the polymerization reaction.

The resulting reaction mixture was mixed with a sulfuric acid-acidified aqueous $MgSO_4$ solution, and the rubbery product so salted out was washed with water and dried, whereby 2,010 g of fluorine-containing block copolymer A having a Mooney viscosity $ML_{1+10}$ (125° C.) of 23 was obtained (polymerization rate: 98.5%).

(1) 100 parts by weight of the resulting fluorine-containing block copolymer A was mixed with 30 parts by weight of MT carbon black, 4.5 parts by weight of triallyl isocyanurate (60%), 3.5 parts by weight of an organic peroxide (Perhexa 2,5B-40, trademark of a product commercially available from NOF Corp.) and 3 parts by weight of lead oxide, and the mixture was kneaded by a two roll. The resulting kneaded mixture was subjected to press vulcanization at 170° C. for 10 minutes and then to oven vulcanization (secondary vulcanization) at 200° C. for 4 hours.

The resulting vulcanization product was tested for normal state physical properties according to JIS K-6301, solvent resistance (percent volumic change after dipping in methanol at 60° C. for 3 days) and cold resistance (TR-10).

(2) The kneaded mixture of said (1) was admixed with 10 parts by weight of perfluoropolyether [Aflunox 400, trademark of a product commercially available from Nippon Mektron K. K., viscosity: 400Cst (25° C.)]. The resulting vulcanization product was tested for the same items as above.

EXAMPLE 2

In Example 1, 416.4 g of PFE-2 of Reference Example 2 was used in place of PFE-1 and 1,990 g of fluorinecontaining block copolymer B having a Mooney viscosity $ML_{1+10}$ (125° C.) of 17 was obtained (polymerization rate: 97.5%).

The resulting fluorine-containing block copolymer B was subjected to the same kneading as in Example 1 (1), and the kneaded mixture was subjected to the same vulcanization and tests as in Example 1 (1).

COMPARATIVE EXAMPLE 1

(1) In Example 1 (1), a quaternary copolymer of vinylidene fluoridetetrafluoroethylene-perfluoro(methyl vinyl ether)-perfluoro(2-bromoethyl vinyl ether) in a molar ratio of 69.6:10:20:0.4 was used in place of the fluorine-containing block copolymer A and the mixture was subjected to kneading, vulcanization and tests in the same manner as in Example 1 (1).

(2) In Example 1 (2), a quaternary copolymer of vinylidene fluoridetetrafluoroethylene-perfluoro(methyl vinyl ether)-perfluoro(2-bromoethyl vinyl ether in a molar ratio of 69.6:10:20:0.4 was used in place of the fluorine-containing block copolymer A and the mixture was subjected to kneading, vulcanization and test in the same manner as in Example 1 (1).

COMPARATIVE EXAMPLE 2

In Example 1 (1), a quaternary copolymer of vinylidene fluoridetetrafluoroethylene-perfluoro(methyl vinyl ether)-perfluoro(2-bromoethyl vinyl ether) in a molar ratio of 59.6:20:20:0.4 was used in place of the fluorine-containing block copolymer A, and the mixture was subjected to kneading, vulcanization and tests in the same manner as in Example 1 (1). rest results in the foregoing Examples and Comparative Examples are shown in the following Table. The vulcanization product of Comparative Example 1 (2) had much bleeding of perfluoropolyether oil and failed to test.

| Test items | Ex. 1(1) | Ex. 1(2) | Ex. 2 | Comp. Ex. 1(1) | Comp. Ex. 2 |
|---|---|---|---|---|---|
| [Normal state physical properties] | | | | | |
| Hardness (JIS A) | 72 | 67 | 71 | 74 | 73 |
| Tensile strength (MPa) | 16.7 | 13.2 | 14.9 | 20.8 | 21.2 |
| Elongation (%) | 280 | 320 | 290 | 240 | 250 |
| [Solvent resistance] | | | | | |
| Methanol (%) | +38.6 | +35.7 | +39.2 | +71.9 | +42.3 |
| [Cold resistance] | | | | | |
| TR-10 (° C.) | −37 | −40 | −35 | −31 | −25 |

What is claimed is:

1. A process for producing a fluorine-containing block copolymer, which comprises subjecting vinylidene fluoride and at least one of other fluorine-containing monomers to copolymerization reaction in the presence of a polyfluoropolyether having iodo groups at both terminals, represented by the following formula:

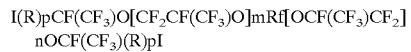

where Rf is a perfluoroalkylene group having 2 to 6 carbon atoms, R is an alkylene group or a polyfluoroalkylene group having 2 to 8 carbon atoms, these alkylene groups may contain an ether group or may be an alkyleneamide-containing or phenylenediamine-containing group, m an n each are positive integers, sum total of m and n is 20 or more and p is 0 or 1.

2. A process according to claim 1, wherein the copolymerization is carried out so that the block copolymer can contain 30 to 85% by mole of vinylidene fluoride.

3. A process according to claim 1, wherein, besides the vinylidene fluoride and the other fluorine-containing monomers, an olefine compound having 2 to 6 carbon atoms is further subjected to copolymerization in a proportion of not more than about 10% by weight on the basis of monomer mixture.

4. A process according to claim 1, wherein the polyfluoropolyether having iodo groups at both terminals is used in proportion of 3 to 25% by weight to sum total of monomer mixture.

5. A process according to claim 1, wherein the copolymerization reaction is carried out in the presence of a bromine-containing or iodine-containing monomer compound.

6. A process according to claim 5, wherein the bromine-containing or iodine-containing monomer compound is used in a proportion of about 0.05 to about 5% by mole to sum total of monomer mixture.

7. A fluorine-containing block copolymer composition which comprises a block copolymer produced according to claim 1 and a perfluoropolyether oil.

8. A fluorine-containing block copolymer composition according to claim 7, wherein the perfluoropolyether oil is used in a proportion of about 5 to about 30 parts by weight to 100 parts by weight of the fluorine-containing block copolymer.

* * * * *